US012139428B2

(12) United States Patent
Kim et al.

(10) Patent No.: US 12,139,428 B2
(45) Date of Patent: Nov. 12, 2024

(54) DISK FILTER FOR PREVENTING SCALE FORMATION AND WATER TREATMENT APPARATUS AND METHOD USING THE SAME

(71) Applicant: Doosan Heavy Industries & Construction Co., LTD., Changwon-si (KR)

(72) Inventors: Seong Ju Kim, Jinju-si (KR); Hwan Chul Cho, Seoul (KR); Yang Oh Jin, Yongin-si (KR)

(73) Assignee: Doosan Heavy Industries & Construction Co. LTD, Hangwon-si (KR)

( * ) Notice: Subject to any disclaimer, the term of this patent is extended or adjusted under 35 U.S.C. 154(b) by 0 days.

(21) Appl. No.: 16/166,063

(22) Filed: Oct. 19, 2018

(65) Prior Publication Data
US 2019/0119135 A1    Apr. 25, 2019

(30) Foreign Application Priority Data

| Oct. 23, 2017 | (KR) | 10-2017-0137584 |
| Oct. 24, 2017 | (KR) | 10-2017-0138603 |
| Jan. 2, 2018  | (KR) | 10-2018-0000176 |

(51) Int. Cl.
*C02F 3/30* (2023.01)
*B01D 29/33* (2006.01)
(Continued)

(52) U.S. Cl.
CPC .............. *C02F 5/04* (2013.01); *B01D 29/33* (2013.01); *B01D 29/395* (2013.01); *B01D 29/50* (2013.01);
(Continued)

(58) Field of Classification Search
CPC .......... C02F 3/307; C02F 1/003; C02F 1/281; C02F 2209/14; C02F 2209/15;
(Continued)

(56) References Cited

U.S. PATENT DOCUMENTS

| 6,096,197 A * | 8/2000 | Hughes .............. C02F 1/003 210/232 |
| 2009/0008238 A1* | 1/2009 | Williams .............. A61L 2/20 204/157.48 |

(Continued)

FOREIGN PATENT DOCUMENTS

| JP | 2003-53385 A | 2/2003 |
| KR | 10-2010-0121689 A | 11/2010 |

(Continued)

OTHER PUBLICATIONS

EPA; Emerging Technologies for Wastewater Treatment and In-Plant Wet Weather Management, p. 144-166 (Year: 2013).*

*Primary Examiner* — Terry K Cecil
(74) *Attorney, Agent, or Firm* — Foundation Law Group LLP; JD Harriman (57) ABSTRACT

The system relates to a disk filter for effectively preventing scale formation in a water treatment process, and to a water treatment apparatus and method using the same. The disk filter includes a housing having a cylindrical shape, a raw water inlet formed at a predetermined position on the side surface of the housing, a raw water outlet formed at a central region in the bottom of the housing, a backwash water outlet formed at a central region in the top of the housing, a ceramic filter provided in a circular disk shape inside the housing, and a scale formation inhibitor loaded in a flow channel formed inside the ceramic filter, wherein raw water introduced via the raw water inlet passes through the ceramic filter and then through the flow channel filled with (Continued)

the scale formation inhibitor, and is then discharged via the raw water outlet.

13 Claims, 10 Drawing Sheets

(51) Int. Cl.
*B01D 29/39* (2006.01)
*B01D 29/50* (2006.01)
*B01D 29/66* (2006.01)
*B01D 39/20* (2006.01)
*C02F 1/00* (2023.01)
*C02F 1/28* (2023.01)
*C02F 5/04* (2023.01)
*C02F 101/16* (2006.01)

(52) U.S. Cl.
CPC ......... *B01D 29/66* (2013.01); *B01D 39/2068* (2013.01); *B01D 39/2075* (2013.01); *C02F 1/004* (2013.01); *C02F 1/008* (2013.01); *C02F 1/281* (2013.01); *C02F 3/307* (2013.01); *C02F 1/001* (2013.01); *C02F 2101/166* (2013.01); *C02F 2209/08* (2013.01); *C02F 2209/105* (2013.01); *C02F 2209/36* (2013.01); *C02F 2303/22* (2013.01)

(58) Field of Classification Search
CPC .. C02F 2209/44; C02F 2303/22; C02F 3/006; C02F 3/305; C02F 1/001; C02F 1/004; C02F 1/008; C02F 1/283; C02F 2101/16; C02F 2101/166; C02F 2201/006; C02F 2209/006; C02F 2209/05; C02F 2209/08; C02F 2209/105; C02F 2209/36; C02F 2209/40; C02F 2209/445; C02F 2303/02; C02F 2303/04; C02F 2303/24; C02F 2305/06; C02F 2307/06; C02F 3/2826; C02F 3/2833; C02F 3/302; C02F 3/303; C02F 5/04; C02F 9/00; C02F 9/14; C02F 1/44; C02F 3/06; C02F 3/34; C02F 3/10; C02F 3/02; C02F 9/04; C02F 3/08; C02F 3/30; C02F 3/12; C02F 9/02; C02F 3/20; B01D 24/10; B01D 29/117; B01D 29/33; B01D 29/395; B01D 29/50; B01D 29/66; B01D 36/02; B01D 39/2068; B01D 39/2075; B01D 2201/60; B01D 29/35; B01D 29/46; B01D 65/02; E03C 1/04; E03C 2201/40; G01N 27/06; G01N 33/18; Y02E 50/30; Y02E 50/343; Y02W 10/10
See application file for complete search history.

(56) References Cited

U.S. PATENT DOCUMENTS

| | | | |
|---|---|---|---|
| 2011/0006018 A1* | 1/2011 | Ben-Horin | B01D 29/46 210/806 |
| 2013/0220913 A1* | 8/2013 | Cohen | B01D 29/68 210/275 |
| 2016/0375383 A1 | 12/2016 | Mazor | |
| 2016/0375385 A1 | 12/2016 | Mazor | |
| 2018/0009687 A1* | 1/2018 | Murthy | C02F 3/006 |

FOREIGN PATENT DOCUMENTS

| | | | |
|---|---|---|---|
| KR | 20100121689 A | | 11/2010 |
| KR | 10-1279628 B | | 5/2013 |
| KR | 10-2013-0096563 | | 8/2013 |
| KR | 10-2013-0096563 A | | 8/2013 |
| KR | 10-1358992 A | | 2/2014 |
| KR | 10-1358992 B | | 2/2014 |
| KR | 101358992 B1 | * | 2/2014 |
| KR | 10-2014-0085720 A | | 7/2014 |

* cited by examiner

Backwash water

Formation of sludge cake
layer on disk filter surface

DISK FILTER FOR PREVENTING SCALE FORMATION AND WATER TREATMENT APPARATUS AND METHOD USING THE SAME

CROSS REFERENCES TO RELATED APPLICATION

The present application claims priority to Korean Patent Application Nos. 10-2017-0137584, filed Oct. 23, 2017, 10-2017-0138603, filed Oct. 24, 2017, and 10-2018-0000176, filed Jan. 2, 2018, the entire contents of which are incorporated herein for all purposes by this reference.

BACKGROUND

1. Field

The system relates to a disk filter and a water treatment apparatus and method using the same. More particularly, the system relates to a disk filter for effectively preventing scale formation in a water treatment process, and to a water treatment apparatus and method using the same.

2. Description of the Background Art

As the demand for industrial water and domestic water (hereinafter referred to as "water") has rapidly increased due to the recent rapid development of industry, the efficient use of water has become a major issue, and thus water treatment systems for treating wastewater in various manners are being devised.

As an example of wastewater treatment methods, an anammox process is receiving attention with the goal of removing large amounts of nitrogen compounds from wastewater. This process enables nitrogen to be removed by reacting ammonia and nitrite to generate nitrogen gas, which consequently may reduce the power consumption required for ammonia oxidation, does not require the addition of an organic material, and may reduce the amount of sludge that is generated compared to a typical nitrification/denitrification process, thus generating economic benefits.

However, raw water, which is to be purified by an anammox process, contains nitrogen, phosphorus, calcium, magnesium and so on at high concentrations, thus forming scale in a pipe, which is undesirable. With the aim of solving this problem, many attempts have been made to use a material such as PVDF or PVC as the material for a pipe or a pump in order to decrease the rate of formation of scale. However, even when PVDF or to PVC is used, the formation of scale is not prevented, and thus the pipe and pump have to be periodically replaced, which is undesirable.

Therefore, it is required to develop a technique for preventing scale formation in pipes of a water treatment apparatus so as to avoid replacing the pipes.

SUMMARY

Accordingly, the system has been made keeping in mind the problems encountered in the related art, and an aspect of the system is to provide a disk filter, which may effectively prevent scale formation in pipes, etc. of a water treatment apparatus, and a water treatment apparatus and method using the same.

Specifically, a ceramic filter and a scale formation inhibitor are used, thus effectively preventing scale formation and facilitating backwashing to thereby alleviate conventional problems in which the entire pipe needs to be replaced.

However, the effects of the system are not limited to the foregoing, and the other effects not mentioned herein will be able to be clearly understood by those skilled in the art from the following description.

The above and other aspects and advantages of the system will become apparent from the following description.

In order to accomplish the above aspect, the system provides a disk filter, comprising: a housing having a cylindrical shape; a raw water inlet formed at a predetermined position on the side surface of the housing; a raw water outlet formed at a central region in the bottom of the housing; a backwash water outlet formed at a central region in the top of the housing; a ceramic filter provided in a circular disk shape inside the housing; and a scale formation inhibitor loaded in a flow channel formed inside the ceramic filter, in which raw water introduced via the raw water inlet passes through the ceramic filter and then through the flow channel filled with the scale formation inhibitor, and is then discharged via the raw water outlet.

As such, the ceramic filter may be manufactured by mixing a ceramic powder, a binder, and sodium hexaphosphate, and is manufactured by mixing 100 parts by weight of the ceramic powder, 10 to 50 parts by weight of the binder, and 20 to 40 parts by weight of the sodium hexaphosphate. Here, the binder may be at least one selected from the group consisting of polypropylene, polyurethane, and ultrahigh-molecular-weight polyethylene.

Also, the scale formation inhibitor in one embodiment is a ball formed of sodium polyphosphate ($(NaPO_3)_x$, x being a positive number), and the flow channel filled with the scale formation inhibitor is provided with a loss prevention plate for preventing loss of the scale formation inhibitor.

In addition, the system provides a water treatment apparatus including a disk filter, the water treatment apparatus comprising: an anaerobic tank including a first inlet for feeding raw water containing nitrate ($NO_3^-$) and a second inlet for feeding raw water containing a carbon source; an anammox reaction tank including a third inlet for feeding raw water containing an ammonium ion ($NH_4^+$) and a treatment water outlet and containing an anammox microorganism therein; and a disk filter disposed upstream of the third inlet and configured to remove a scale-inducing material from the raw water containing the ammonium ion.

Here, an opening/closing part may be provided between the anaerobic tank and the anammox reaction tank, whereby raw water treated in the anaerobic tank may be transferred to the anammox reaction tank through the opening/closing part.

Also, the anaerobic tank and/or the anammox reaction tank may include a stirrer for mixing the raw water introduced therein.

Here, the disk filter may include a housing having a cylindrical shape; a raw water inlet formed at a predetermined position on the side surface of the housing; a raw water outlet formed at a central region in the bottom of the housing; a backwash water outlet formed at a central region in the top of the housing; a ceramic filter provided in a circular disk shape inside the housing; and a scale formation inhibitor loaded in a flow channel formed inside the ceramic filter, in which raw water introduced via the raw water inlet passes through the ceramic filter and then through the flow channel filled with the scale formation inhibitor, and is then discharged via the raw water outlet.

As such, the ceramic filter may be manufactured by mixing a ceramic powder, a binder, and sodium hexaphosphate, and in one embodiment is manufactured by mixing 100 parts by weight of the ceramic powder, 10 to 50 parts by weight of the binder, and 20 to 40 parts by weight of the sodium hexaphosphate. Here, the binder may be at least one selected from the group consisting of polypropylene, polyurethane, and ultrahigh-molecular-weight polyethylene.

Also, the scale formation inhibitor in one embodiment is a ball formed of sodium polyphosphate $((NaPO_3)_x$, x being a positive number), and the flow channel filled with the scale formation inhibitor in one embodiment is provided with a loss prevention plate for preventing the loss of the scale formation inhibitor.

Also, the water treatment apparatus may include a filter module, connected to the treatment water outlet of the anammox reaction tank and into which raw water discharged from the anammox reaction tank is fed, and a recovery unit for supplying backwash water to the filter module.

Here, a filter included in the filter module may have a pore size of 25 to 300 μm. Furthermore, the anammox reaction tank may include a measurement part for measuring the sludge concentration of the anammox microorganism contained in the raw water. Also, the filter module may include a plurality of filters having different pore sizes, and a controller may be provided to select the disk filter suitable for filtering raw water depending on the concentration measured using the measurement part of the anammox reaction tank.

In addition, the system provides a water treatment method using the aforementioned disk filter, comprising: (S1) introducing raw water into a raw water inlet formed at a predetermined position on the side surface of a housing; (S2) passing the raw water through a ceramic filter provided inside the housing; and (S3) mixing the raw water with a scale formation inhibitor loaded in a flow channel formed inside the ceramic filter and then discharging the raw water through a raw water outlet.

As such, the ceramic filter may be manufactured by mixing a ceramic powder, a binder, and sodium hexaphosphate, and in one embodiment is manufactured by mixing 100 parts by weight of the ceramic powder, 10 to 50 parts by weight of the binder, and 20 to 40 parts by weight of the sodium hexaphosphate. Here, the binder may be at least one selected from the group consisting of polypropylene, polyurethane, and ultrahigh-molecular-weight polyethylene.

Also, the scale formation inhibitor in one embodiment is a ball formed of sodium polyphosphate $((NaPO_3)_x$, x being a positive number).

DETAILED DESCRIPTION

Hereinafter, a detailed description will be given of the system with reference to the accompanying drawings. Before the system is described in detail, it must be noted that the terms and words used in the present specification and claims should not be interpreted as being limited to typical meanings or dictionary definitions, but should be interpreted as having meanings and concepts relevant to the technical scope of the system.

In the description of the embodiments, it is to be understood that the formation of any member "on" or "under" another member includes not only the case where the member is in contact with the other member but also the case where a further member is present between the two members.

In the description of the embodiments, when any part "includes" any element, it is to be understood that it may further include the other elements as well, without excluding the other elements unless otherwise stated.

The reference numerals in individual steps are used for the sake of description, and do not indicate the order of the steps. Individual steps may be performed differently from the described order unless the specific order is explicitly stated in context. That is, individual steps may be performed in the described order or in the reverse order, or may be substantially simultaneously conducted.

Wherever possible, the same reference numerals are used throughout the drawings to refer to the same or like parts. The following description does not limit the system to specific embodiments, and moreover, descriptions of known techniques, even if they are pertinent to the system, are considered unnecessary and may be omitted insofar as they would make the characteristics of the system unclear.

In the description of elements in the embodiments of the system, the terms "first", "second", "A". "B", "(a)", "(b)", etc. may be used. These terms are merely used to distinguish one element from another element, and the nature, sequence or order of the corresponding elements is not limited by the above terms.

As used herein, when any element is referred to as being "connected", "coupled" or "linked" to another element, it may not only indicate being "directly connected", but may also indicate a further element being "connected", "coupled" or "linked" therebetween.

Hereinafter, a detailed description will be given of the system with reference to the embodiments of the system and the drawings. These embodiments are merely set forth to illustrate the system but are not to be construed as limiting the scope of the system, as will be apparent to those skilled in the art.

Unless otherwise defined, all terms including technical and scientific terms used herein have the same meaning as those commonly understood by one of ordinary skill in the art to which the system belongs. In the case where the meanings thereof conflict, the description including the definitions herein shall prevail.

In order to clearly illustrate the system proposed in the drawings, parts not related to the description are omitted, and similar parts are denoted by similar reference numerals throughout the specification. It is also to be understood that when any part is referred to as "comprising" or "including" any element, it does not exclude other elements, but may further include the same unless otherwise stated. As used herein, the term "part" refers to a "unit" or "block" responsible for a specific function.

The ordinals ("first", "second", etc.) in individual steps are used for the sake of description and do not explain the order of the steps. Individual steps may be performed differently from the described order unless the specific order is explicitly stated in context. That is, individual steps may be performed in the described order or in the reverse order, or may be substantially simultaneously conducted.

Figure 1:
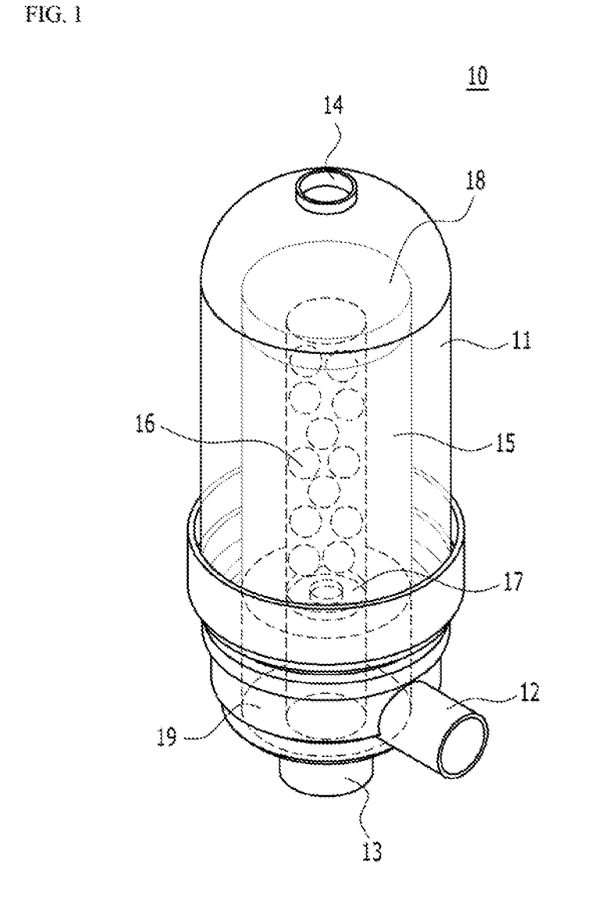
FIG. 1 is a perspective view schematically showing a disk filter according to an embodiment of the system.
Figure 2:
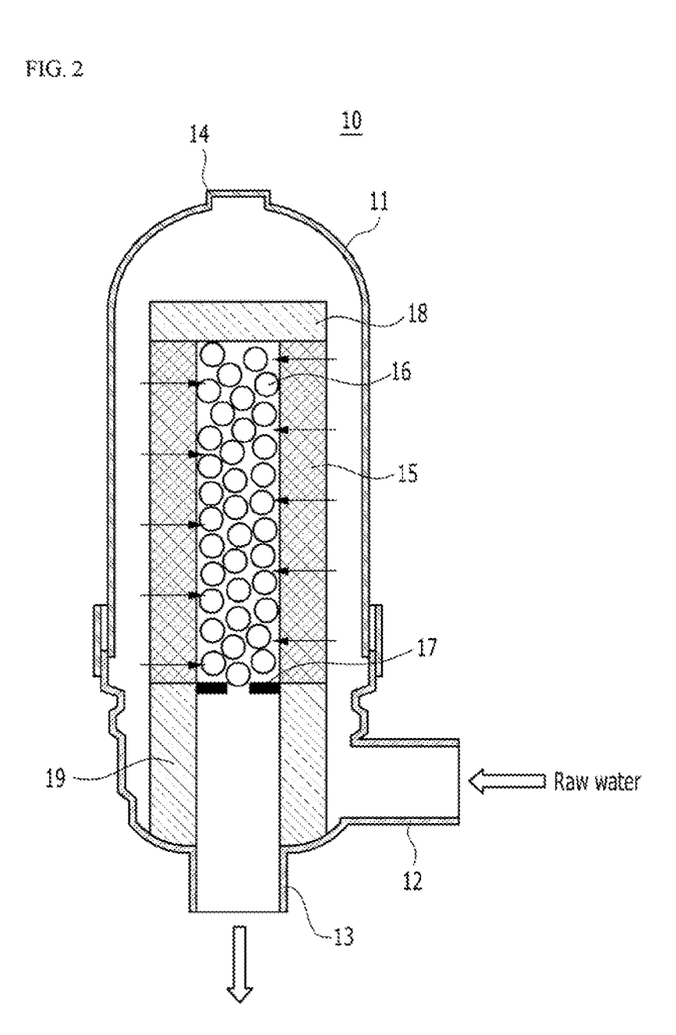
FIG. 2 schematically shows the cross-section of FIG. 1.

FIG. 1 is a perspective view schematically showing a disk filter 10 according to an embodiment of the system, and FIG. 2 schematically shows the cross-section of FIG. 1. With reference to FIGS. 1 and 2, the disk filter 10 according to an embodiment of the system includes a housing 11 having a cylindrical shape, a raw water inlet 12 formed at a predetermined position on the side surface of the housing 11, a mw water outlet 13 formed at the central region in the bottom of the housing 11, a backwash water outlet 14 formed at the central region in the top of the housing 11, a ceramic filter 15 provided in the form of a circular disk inside the housing 11, and a scale formation inhibitor 16 loaded in a flow channel formed inside the ceramic filter 15, in which raw water fed via the raw water inlet 12 passes through the ceramic filter 15 and then through the flow channel filled with the scale formation inhibitor 16, and is then discharged via the raw water outlet 13.

The disk filter 10 of the system is capable of effectively preventing scale formation in multiple pipes of the water treatment apparatus, and the fed raw water passes through the ceramic filter 15 while rotating inside the housing 11, whereby the scale-inducing material is primarily removed by means of the ceramic filter 15 and is secondarily removed by means of the scale formation inhibitor 16 while passing through the flow channel filled with the scale formation inhibitor 16, thus effectively preventing scale formation (as such, the backwash water outlet is closed). As used herein, the term "scale" refers to a substance attached to a pipe by the accumulation of metal components (calcium, magnesium, etc.) remaining in water, and prevents the flow of raw water, and the scale-inducing material mainly indicates a metal component such as calcium, magnesium, or the like.

Figure 3:
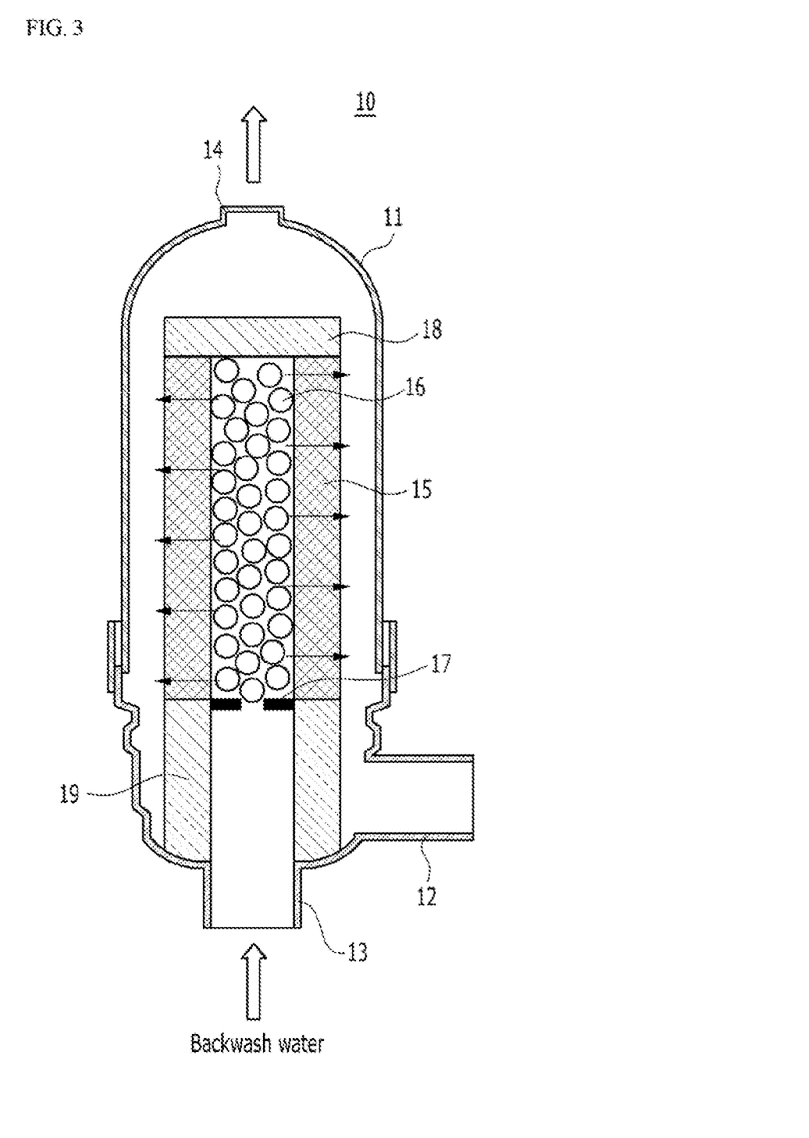
FIG. 3 schematically shows the cross-section of FIG. 1 (a backwashing process)

The housing 11 is not particularly limited, but in one embodiment has a cylindrical shape, the side surface of which is gently curved. Thereby, raw water fed via the raw water inlet 12 is able to efficiently rotate in the housing 11 to thus prevent the flow of raw water from being blocked. The raw water inlet 12 is a passage through which raw water pressurized by a pump (not shown) is introduced, and may be provided at a predetermined position (upper or lower position) on the side surface of the housing 11. The raw water outlet 13 is an outlet through which raw water from which the scale-inducing material has been removed is discharged, and is connected to the flow channel formed inside the ceramic filter 15, and may be formed at the central region in the bottom of the housing. The backwash water outlet 14 is formed at the central region in the top of the housing 11. The backwashing process is performed to wash the inside of the disk filter 10 using backwash water when there is a need to wash the ceramic filter 15 or the scale formation inhibitor 16, which will be described later, due to the long-term use thereof. Here, the backwash water is fed via the raw water outlet 13 to thus wash the scale formation inhibitor 16, and passes through the ceramic filter 15 and is then discharged via the backwash water outlet 14 (FIG. 3, in which the raw water inlet is closed). Also, in order to allow the raw water to flow through the ceramic filter 15 during the removal of the scale-inducing material or the backwashing process, an upper barrier 18 and a lower barrier 19 may be provided respectively to the upper and lower portions of the ceramic filter 15.

When viewed from above, the ceramic filter 15 has a circular disk shape, the center of which is formed with a flow channel, and the flow channel, through which raw water moves, is formed in a longitudinal direction (the downward direction in FIG. 1). The flow channel formed inside the ceramic filter 15 is filled with the scale formation inhibitor 16. The ceramic filter 15 may be manufactured by mixing a ceramic powder, a binder, and sodium hexaphosphate, and in one embodiment is manufactured by mixing 100 parts by weight of the ceramic powder, 10 to 50 parts by weight of the binder, and 20 to 40 parts by weight of sodium hexaphosphate in order to increase the removal efficiency of scale-inducing material.

The ceramic powder, which is a main component that constitutes the ceramic filter 15, is composed of kaolin or elvan, and may further include 10 to 50 parts by weight of a zeolite powder based on 100 parts by weight of kaolin or elvan. The ceramic powder functions to appropriately adjust the amount of sodium hexaphosphate that is dissolved, thus improving the effect of prevention of scale formation, as will be described later.

The binder functions to bind the ceramic powder and sodium hexaphosphate, and may include at least one selected from the group consisting of polypropylene, polyurethane, and ultrahigh-molecular-weight polyethylene. Here, the ultrahigh-molecular-weight polyethylene in one embodiment has a molecular weight of 4,000,000 or more. The binder in one embodiment is contained in an amount of 10 to 50 parts by weight based on 100 parts by weight of the ceramic powder. If the amount of the binder is less than 10 parts by weight, the binding force of the ceramic powder and sodium hexaphosphate may decrease. On the other hand, if the amount of the binder exceeds 50 parts by weight, the mechanical properties of the prepared ceramic filter 15 may deteriorate.

Sodium hexaphosphate functions to suppress attachment of the scale-inducing material contained in raw water to the surface of the ceramic filter 15. Sodium hexaphosphate has the advantage of being non-toxic as well as exhibiting a superior prevention effect of scale formation because it does not corrode. Sodium hexaphosphate in one embodiment is contained in an amount of 20 to 40 parts by weight based on 100 parts by weight of the ceramic powder. If the amount of sodium hexaphosphate is less than 20 parts by weight, the efficiency of prevention of scale formation may decrease, and the period of time for maintaining the effect of prevention of scale formation may be shortened. On the other hand, if the amount of sodium hexaphosphate exceeds 40 parts by weight, mechanical properties may deteriorate and manufacturing costs may increase.

The scale formation inhibitor 16 is loaded in the flow channel in a longitudinal direction inside the ceramic filter 15, and functions to remove the scale-inducing material, such as magnesium or calcium, from raw water. The scale formation inhibitor 16 is not particularly limited, but in one embodiment includes balls formed of sodium polyphosphate ($(NaPO_3)_x$, x being a positive number) capable of effectively removing calcium or magnesium. When the water treatment apparatus for removing a nitrogen compound through an anammox process is described by way of example, raw water introduced for the anammox process contains large amounts of ammonium ions, metal materials such as magnesium, and phosphorus components. In this case, scale such as struvite resulting from the accumulation of magnesium, ammonium ions, and phosphorus at about 1:1:1 may be formed in the pipe through which raw water flows. Thus, the effective removal of magnesium is regarded as important in order to prevent the formation of struvite. When sodium polyphosphate balls are used as the scale formation inhibitor 16, as represented in Schemes 1 and 2 below, magnesium, calcium, etc. may be effectively removed, thereby preventing the formation of scale such as struvite.

$$Ca^{2+}+Na_2[Na_4(PO_3)_6] \rightarrow 2Na^+ + Na_2[Na_2Ca(PO_3)_6]$$
(soluble complex) [Scheme 1]

$$Mg^{2+}+Na_2[Na_2(PO_3)_6] \rightarrow 2Na^+ + Na_2[Na_2Mg(PO_3)_6]$$
(soluble complex) [Scheme 2]

Also, in order to prevent the scale formation inhibitor 16 from being lost together with raw water, the flow channel filled with the scale formation inhibitor 16 may be provided with a loss prevention plate 17. The loss prevention plate 17 may have a hole formed in the center thereof so that only the raw water may pass therethrough, but the system is not limited thereto, and the loss prevention plate may be provided in the form of a mesh structure having openings through which the scale formation inhibitor 16 cannot pass.

Next, the water treatment apparatus 100 including the disk filter is described. With regard to the disk filter 10, reference is to be made to the above description, and a redundant description is omitted.

Figure 4:
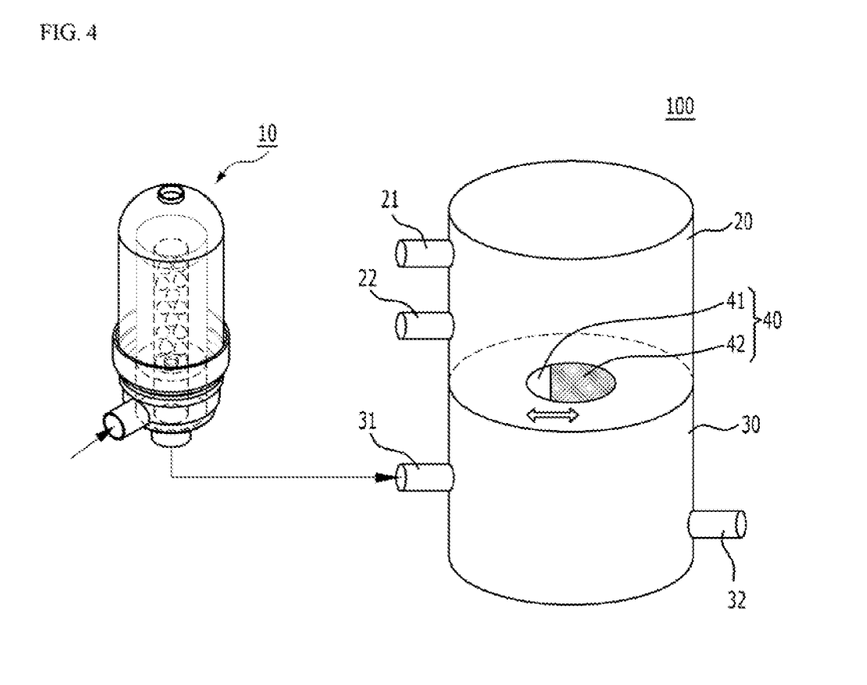
FIG. 4 schematically shows a water treatment apparatus including a disk filter according to an embodiment of the system.

FIG. 4 schematically shows the water treatment apparatus 100 including the disk filter according to an embodiment of the system. With reference to FIG. 4, the water treatment apparatus 100 including the disk filter according to an embodiment of the system comprises: an anaerobic tank 20 including a first inlet 21 for feeding raw water containing nitrate ($NO_3^-$) and a second inlet 22 for feeding raw water containing a carbon source; an anammox reaction tank 30 including a third inlet 31 for feeding raw water containing ammonium ions ($NH_4^-$) and a treatment water outlet 32, and containing therein anammox microorganisms; and a disk filter 10 disposed upstream of the third inlet 31 and configured to remove a scale-inducing material from the raw water containing ammonium ions. Specifically, the disk filter 10 is disposed upstream of the water treatment apparatus, which is capable of effectively removing nitrogen compounds through an anammox process, whereby the scale-inducing material is removed, and thus the water treatment apparatus may efficiently operate.

Hereinafter, a description of the disk filter 10 is omitted, and a detailed description will be given of the anaerobic tank 20 and the anammox reaction tank 30.

Anammox is an acronym for ANaerobic AMMonium OXidation, and refers to a microorganism species metabolized by nitrogen or a process using the same. Anammox is a technique for ultimately reducing a nitrogen compound into nitrogen gas that is then emitted, and is recently receiving attention in the water treatment field. A typical anammox process is performed in a manner in which ammonia-oxidizing bacteria oxidizes half of the ammonium ions to produce nitrite ions (nitrite), as represented in Scheme 3 below.

$$2NH_4^+ + 3O_2 \rightarrow 2O_2^- + 4H^+ + 2H_2O \quad [Scheme\ 3]$$

Subsequently, anammox bacteria (anammox microorganisms) allow ammonium ions and nitrite ions to react with each other to generate nitrogen, thereby removing nitrogen compounds, as represented in Scheme 4 below. Here, ammonium ions and nitrite react at a molar ratio of about 1:1.

$$NH_4^+ + NO_2^- \rightarrow N_2 + 2H_2O \quad [Scheme\ 4]$$

Figure 5:
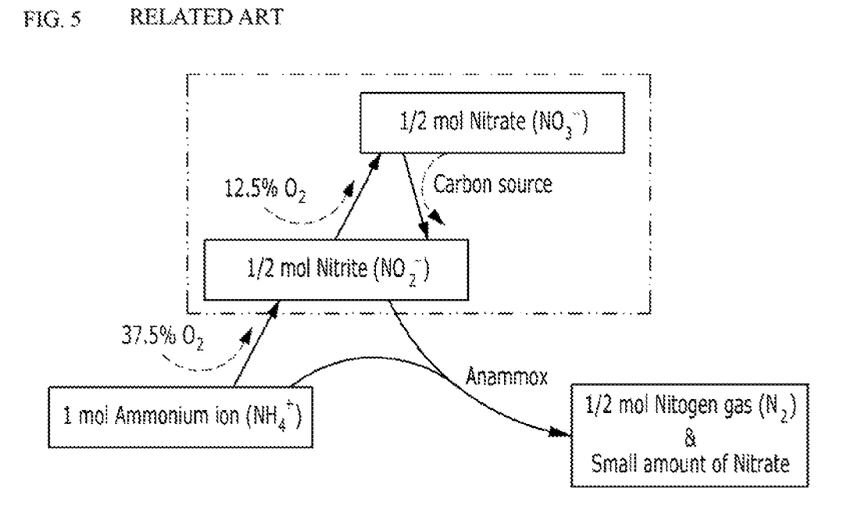
FIG. 5 schematically shows a typical anammox process.

However, as shown in FIG. 5 (in a box portion), a typical anammox process involves conversion of ammonium ions into nitrite, followed by conversion of nitrite into nitrate due to over-aeration. Hence, the process of converting the nitrate to the nitrite using an additional carbon source has to be conducted, and thus the removal efficiency of nitrogen compounds is lowered.

Figure 6:
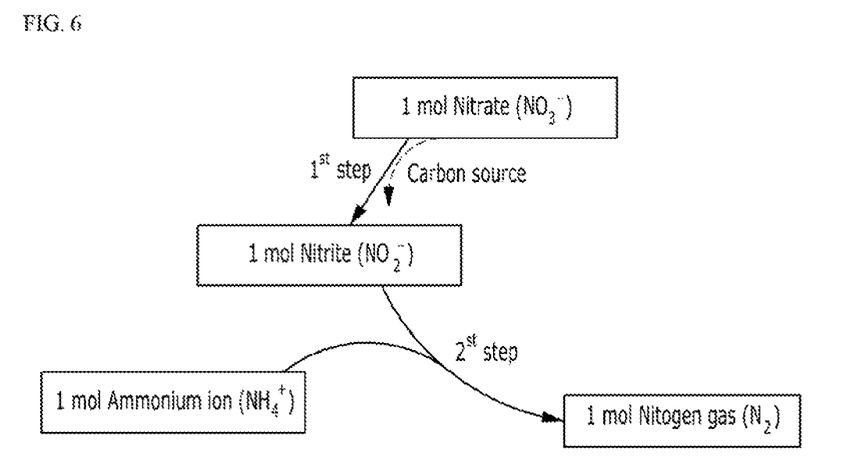
FIG. 6 schematically shows an anammox process using the water treatment apparatus including a disk filter according to an embodiment of the system.

Therefore, as shown in FIG. 6, the system excludes the conversion of nitrite to nitrate and has improved the removal efficiency of nitrogen compounds using raw water (for example, concentrated water produced in the reverse osmosis process) containing a large amount of nitrate generated in the water treatment process. Specifically, raw water containing a large amount of nitrate and raw water containing a carbon source are mixed in the anaerobic tank 20 to thus convert nitrate to nitrite, as represented in Scheme 5 below. As such, the raw water containing the carbon source may utilize a portion of raw water that has not yet been supplied to the reverse osmosis process, and various carbon sources may be supplied, if necessary. For example, at least one selected from the group consisting of methanol ($CH_3OH$), ethanol ($C_2H_5OH$), methane ($CH_4$), acetic acid ($CH_3COOH$), 2-octanamidoacetic acid, and glycerol may be used, but is not limited thereto.

$$3NO_3^- + CH_3OH \rightarrow 3NO_2^- + CO_2 + 2H_2O \quad [Scheme\ 5]$$

The raw water containing nitrite produced in the anaerobic tank 20 is supplied into the anammox reaction tank 30. The anammox reaction tank 30 contains therein anammox microorganisms, and raw water containing ammonium ions is introduced thereto. Here, the anammox microorganisms may include at least one selected from the group consisting of Candidatus Kuenenia, Candidatus Brocadia, Candidatus Anammoxoglobus, Candidatus Jettenia, and Candidatus Scalindua. Also, the raw water containing ammonium ions may utilize a portion of raw water that is introduced to the water treatment process. For example, a portion of raw water that has not yet been supplied to the reverse osmosis process may be utilized. In the anammox reaction tank 30, ammonium ions react with nitrite to generate nitrogen gas, as represented in Scheme 6 below.

$$1.0NH_4^+ + 1.32NO_2^- + 0.66HCO_3^- + 0.13H^+ \rightarrow 1.02N_2 + 0.26NO_3^- + 0.66CH_2O_{0.5}N_{0.15} + 2.03H_2O \quad [Scheme\ 6]$$

Specifically, the system may exclude the conversion of ammonium ions into nitrite (Scheme 3) and may also exclude the conversion of nitrite into nitrate (Scheme 4), thereby effectively removing nitrogen compounds using a smaller amount of carbon source (generating nitrogen gas).

In an embodiment of the system, the anaerobic tank 20 and the anammox reaction tank 30 may be disposed at upper and lower positions, and an opening/closing part 40 for allowing or blocking the flow of raw water may be provided between the anaerobic tank 20 and the anammox reaction tank 30. The opening/closing part 40 is not particularly limited, and may be provided in various forms. For example, it may be provided in a form in which a circular hole 41 is opened or closed by a door 42.

In an embodiment of the system, the anaerobic tank 20 and/or the anammox reaction tank 30 may include a stirrer (not shown) in order to efficiently stir raw water accommodated therein. The stirrer may include any type of known stirring machine, and is not particularly limited.

As described above, the disk filter 10 of the system is capable of effectively blocking the generation of scale during the water treatment process, and may be easily applied to the water treatment apparatus capable of removing nitrogen compounds.

Figure 7:
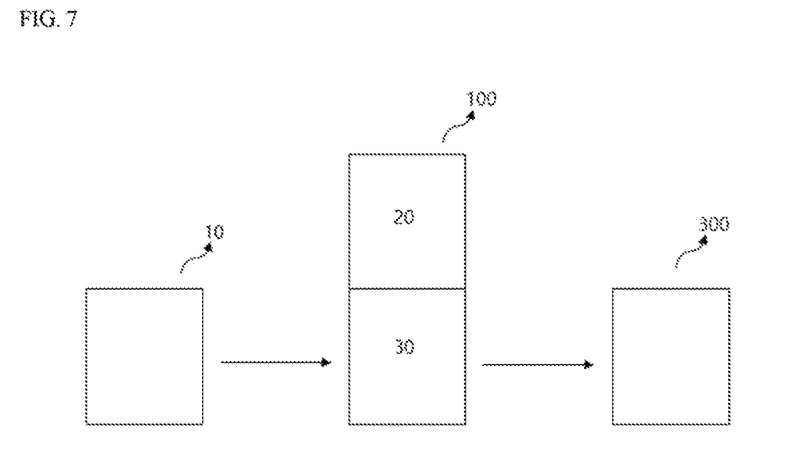
FIG. 7 schematically shows a water treatment apparatus including a disk filter according to an embodiment of the system.
Figure 8:
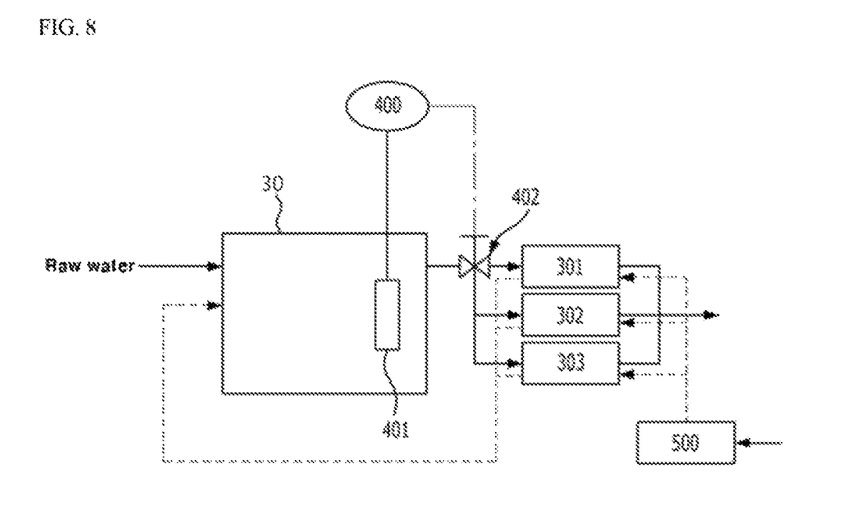
FIG. 8 schematically shows a filter module and a recovery unit.

In an embodiment of the system, as shown in FIGS. 7 and 8, the water treatment apparatus 100 with the disk filter may include a filter module 300 connected to the treatment water outlet 32 of the anammox reaction tank 30 and into which raw water discharged from the anammox reaction tank 30 is introduced; and a recovery unit 500 for supplying backwash water into the filter module 300. The raw water discharged through the treatment water outlet 32 contains floc, which is produced in the anammox reaction tank 30 and is present in the form of solid-phase sludge, and raw water containing solid-phase sludge in the anammox reaction tank 30 is separated into a solid and a liquid through the filter module 300.

In the filter module 300, disk filters (the aforementioned disk filter may be used, but the system is not limited thereto) having various pore sizes, screen filters or cartridge filters may be used in the form of being disposed in series or in parallel. The pore size of the filter may be selected within the range of 25 to 300 μm, and a filter having a pore size of 100 μm is used in one embodiment.

For example, as shown in FIG. 8, the filter module 300 is configured such that disk filters 301, 302, 303 having different pore sizes are connected in parallel (for example, each disk filter is depicted as a single unit, but multiple filter units in which disk filters, screen filters, cartridge filters or combinations thereof are connected in series may be disposed in parallel), and raw water may be supplied to the disk filer having an appropriate pore size by controlling a valve 402 using a controller 400 that receives a signal of a detection device 401 (i.e. a measurement part) located in the anammox reaction tank 30, such as a particle counter for measuring the concentration of sludge contained in the raw water or a detector for measuring the microorganism concentration of raw water, BOD or COD.

For example, the filter module 300, including a disk filter 301 having a pore size of 25 to 50 μm, a disk filter 302 having a pore size of 50 to 100 μm and a disk filter 303 having a pore size of 100 to 200 μm, which are connected in parallel, is provided. Thereafter, when the amount of sludge contained in raw water supplied into the anammox reaction tank 30 is small, the concentration of microorganisms in the sludge detected by the detection device 401 is measured to be low, and the concentration of anammox microorganisms contained in the sludge is also relatively low, and thus raw water discharged from the anammox reaction tank 30 is supplied into the disk filter 301 having a small pore size in the filter module 300 by means of the controller 400.

As the detection device 401 for measurement of quality of raw water, any device may be used without particular limitation, so long as it is a metering device for directly or indirectly measuring the sludge concentration, such as a detector for measuring the microorganism concentration, BOD or COD, a particle counter for directly measuring the amount of formed sludge or floc, or an optical scattering device for directly measuring the concentration of microorganisms.

In this way, when the properties of the raw water supplied into the anammox reaction tank 30 are measured using the detection device, the size of the disk filter suitable for use in solid-liquid separation in the subsequent separation process may be selected based on the measured values, thus making it possible to more effectively perform the solid-liquid separation process.

Figure 9A:
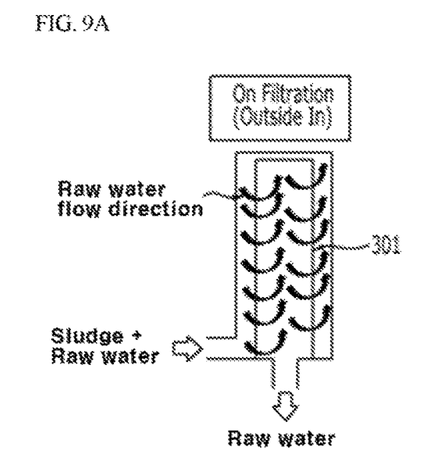
FIGS. 9A~9C show a disk filter in which the solid-liquid separation process is performed.
Figure 9B:
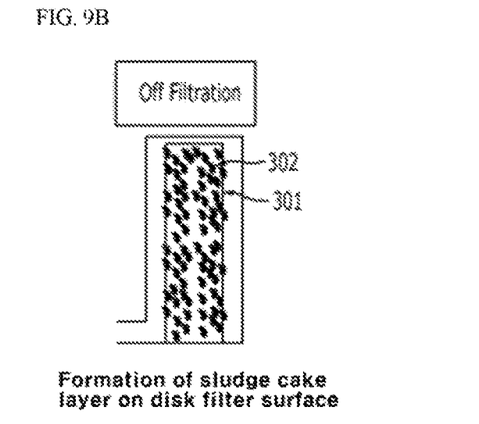
Figure 9C:
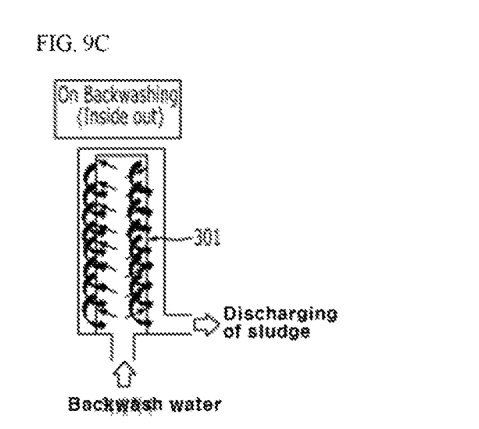

FIGS. 9A, 9B and 9C show the disk filter in which the solid-liquid separation process is performed. As shown in FIGS. 9A, 9B and 9C, the raw water including sludge supplied into the disk filter 301 is subjected to solid-liquid separation via the disk filter 301, thereby forming a cake layer 310 on the surface of the disk filter.

When the sludge is formed as the cake layer on the surface of the disk filter 301 in this way, cake filtration may occur on the surface of the disk filter, and filtration and solid-liquid separation may be more finely performed compared to when the actual pore size is applied.

Thus, the initial formation of the cake layer on the surface of the disk filter is regarded as very important. As described above, the function of the controller 400 for selecting the disk filter having an appropriate pore size depending on the concentration and amount of sludge that is supplied becomes very important.

During the filtration process through the sludge cake layer, the pressure difference ($\Delta P$) applied to the disk filter is gradually increased. When the pressure difference is increased to about 20%, it is desirable to perform backwashing for stable operation of the process.

When the backwash water is supplied from the recovery unit 500 to the disk filter (for example, Inside→Out) in the direction opposite the direction in which the raw water passes through the disk filter (for example, Outside→In), as shown in FIG. 9, the sludge formed on the surface of the disk filter is desorbed by the supplied backwash water. Here, the direction in which the raw water passes through the filter is not necessarily from the outside to the inside, and the opposite direction (Inside→Out) is possible. As such, the direction of supply of backwash water is the opposite direction (Outside→In).

Specifically, the direction in which the raw water passes through the filter is not fixed, but may be selected, and it is important to note that the direction of supply of backwash water is always the opposite of the direction in which raw water passes through the filter.

Here, the desorbed sludge is supplied again to the anammox reaction tank 30, and may thus be reused, thereby more efficiently utilizing the anammox microorganisms.

Figure 10:
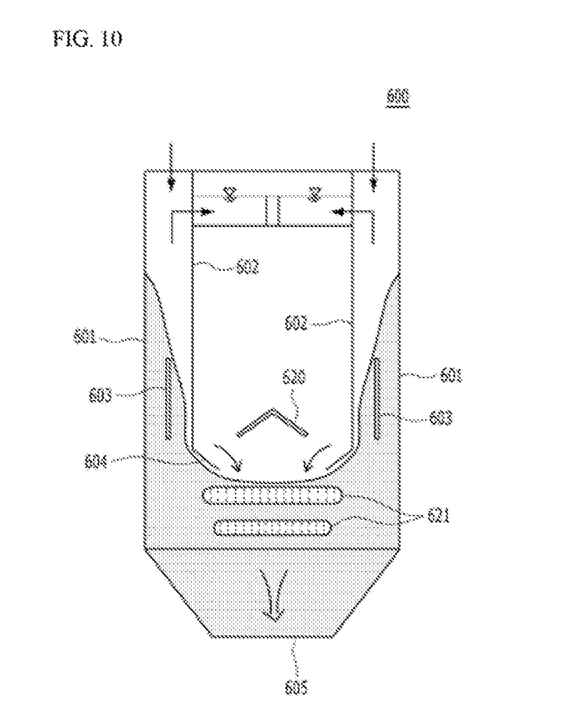
FIG. 10 schematically shows a precipitation tank.

As necessary, a precipitation tank 600 may be further provided between the anammox reaction tank 200 and the filter module 300 of the water treatment apparatus including the disk filter according to an embodiment of the system, as shown in FIG. 10. In this case, it is possible to operate a precipitation tank having a relatively small size compared to conventional precipitation tanks, and the amount of sludge that is subjected to solid-liquid separation in the filter module 300 may be decreased, thus reducing a backwashing period for desorbing the sludge formed on the surface of the filter module 300.

Specifically, the precipitation tank 600 functions such that a portion of the introduced floc is precipitated in the form of sludge and is then discharged and also such that raw water including the remaining floc is supplied to the filter module 300, and is provided with a sludge outlet 605 for discharging the sludge at the lower portion thereof (FIG. 10). The precipitation tank 600 is not particularly limited, and the overall outer appearance thereof has the shape of a cylinder or quadrangular column, and the lower portion thereof is formed so as to be inclined toward the vertical central axis such that the sludge is discharged to the outside.

In an embodiment of the system, the precipitation tank 600 may include a circular orifice pipe 610 at the bottom thereof to effectively precipitate the floc in sludge form. Here, the circular shape conceptually includes both a round shape and an oval shape. The orifice pipe 610 may have therein a plurality of orifice holes 611. When the floc guided downwards along the inner wall 601 of the precipitation tank 600 reaches the circular orifice pipe 610, it passes through the orifice holes 611 at a high speed and is precipitated as sludge and discharged through the sludge outlet 605.

More specifically, the flow rate Q, which indicates a quantity that flows through a predetermined area in a predetermined period of time, may be expressed as a product of the pipe sectional area A and the flow velocity v. When the floc passes through a plurality of orifice holes 611 formed in the circular orifice pipe 610, the flow rate is the same, but the cross-sectional area (orifice area) is sizably reduced and thus the velocity is remarkably increased.

Accordingly, the floc is precipitated into sludge and discharged while passing very rapidly through the orifice holes 611.

In an embodiment of the system, the number of circular orifice pipes 610 may be one or at least two, and the number of orifice pipes 610 is not particularly limited, but may be appropriately selected depending on the size of the precipitation tank 600 or the amount of raw water to be precipitated, and in one embodiment is two or three. When a plurality of circular orifice pipes 610 is provided, the average diameters of the orifice pipes 610 may be the same as or different from each other. In one embodiment, the plurality of circular orifice pipes 610 having different average diameters are disposed in a manner in which the diameter decreases in the downward direction of the precipitation tank 600, thereby further improving the sludge precipitation rate. Here, the average diameter of the circular orifice pipe 610 refers to the average length of the strings passing through the center of the orifice pipe 610.

Figure 11A:
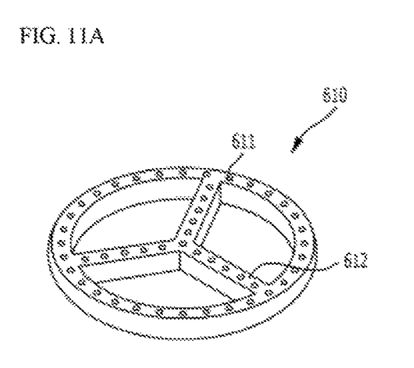
FIGS. 11A~11B schematically show circular orifice pipes.
Figure 11B:
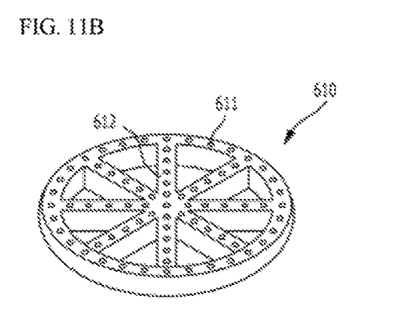

In an embodiment of the system, the circular orifice pipe 610 may include a branch pipe 612 therein. The branch pipe 612 may have a plurality of orifice holes 611. The configuration of the branch pipe 612 is not particularly limited, but may include radial arrangement in the circumferential direction from the center. Specifically, the branch pipe may be provided in the form of trisecting the inside of the circular orifice pipe 610, as shown in FIG. 11A, or in the form of radial arrangement inside the circular orifice pipe 610, as shown in FIG. 11B.

In an embodiment of the system, the precipitation tank 600 may include a bent plate 620 to prevent the sludge from floating. The bent plate 620 may be manufactured in various shapes, but in order to effectively prevent the sludge from floating, the bent plate in one embodiment is provided in the form of a cone having an L-shaped cross-section.

In an embodiment of the system, the precipitation tank 600 may include a baffle 602 spaced apart from the inner wall 601 at a predetermined distance. When raw water including floc is supplied between the inner wall 601 of the precipitation tank 600 and the baffle 602, the fluid including the floc is induced to move toward the lower portion of the precipitation tank 600 by gravity. As such, the movement of the floc toward the upper or central portion of the precipitation tank 600 is blocked by means of the provided baffle 602, and the flow direction may be stably guided downwards along the inner wall 601. As such, the clean water free of floc may be discharged through the upper portion of the precipitation tank 600.

In an embodiment of the system, the precipitation tank 600 may include a guide plate 603 between the inner wall 601 and the baffle 602. The guide plate functions to distribute the flow of fluid (raw water) including the floc so as to maximally prevent the precipitated sludge from flowing again. The number of guide plates 603 is not particularly limited, but may be one to three.

Also, an inclination plate 604 may be provided at the end of the baffle 602 so that the floc or sludge may be stably directed toward the circular orifice pipe 610 without floating to the upper portion of the precipitation tank 600. As such, the direction of inclination of the inclination plate 604 in one embodiment is set such that the end of the inclination plate 604 faces the center of the precipitation tank 600.

Next, the water treatment method using the disk filter will be described. The disk filter 10 noted above may be used, but the system is not limited thereto.

According to an embodiment of the system, the water treatment method using the disk filter comprises: (S1) introducing raw water into a raw water inlet 12 formed at a predetermined position on the side surface of a housing 11; (S2) passing the raw water through a ceramic filter 15 provided inside the housing 11; and (S3) mixing the raw water with a scale formation inhibitor 16 loaded in a flow channel formed inside the ceramic filter 15 and discharging the raw water through a raw water outlet 13.

In the water treatment method according to the system for effectively preventing the scale formation in multiple pipes provided to the water treatment apparatus, the scale-inducing material is primarily removed using the ceramic filter 15, and is secondarily removed using the scale formation inhibitor 16, thereby effectively preventing scale formation. Here, with regard to the ceramic filter 15 and the scale formation inhibitor 16, reference is to be made to the aforementioned description, and a redundant description thereof is omitted.

Although the system has been disclosed for illustrative purposes, those skilled in the art will appreciate that various modifications, additions and substitutions are possible, without departing from the scope and spirit of the system as disclosed in the accompanying claims.

The invention claimed is:

1. A water treatment apparatus comprising:
  a disk filter comprising:
    a housing;
    a raw water inlet formed at a predetermined position on a side surface of the housing;
    a raw water outlet formed at a central region in a bottom of the housing;
    a backwash water outlet formed at a central region in a top of the housing;
    a ceramic filter provided inside the housing, the ceramic filter having an upper barrier and a lower barrier to allow backwash water supplied by a recovery unit to flow through the ceramic filter during a backwash process, wherein the backwash water flows through the recovery unit and is then supplied to flow through the ceramic filter during the backwash process;
  a scale formation inhibitor loaded in a flow channel formed inside the ceramic filter, wherein the raw water introduced via the raw water inlet passes through the ceramic filter and then through the flow channel filled with the scale formation inhibitor, and is then discharged via the raw water outlet;
  an anaerobic tank including a first inlet for feeding raw water containing nitrate ($NO_3^-$) and a second inlet for feeding raw water containing a carbon source;

an anammox reaction tank including a third inlet for feeding raw water containing an ammonium ion ($NH_4^+$) and a treatment water outlet and containing an anammox microorganism therein, the anaerobic tank positioned atop the anammox reaction tank and including an outlet opening on a lower surface thereof in flow communication with the anammox reaction tank; and the disk filter disposed upstream of the third inlet and configured to remove a scale-inducing material from the raw water containing the ammonium ion, wherein a direction of supply of backwash water through the ceramic filter is always in the opposite direction of a direction of the raw water.

2. The water treatment apparatus of claim 1, further comprising: the outlet opening including an opening/closing part provided between the anaerobic tank and the anammox reaction tank, wherein raw water treated in the anaerobic tank is transferred to the anammox reaction tank through the opening/closing part.

3. The water treatment apparatus of claim 1, wherein the anaerobic tank includes a stirrer for mixing the raw water introduced therein.

4. The water treatment apparatus of claim 1, wherein the anammox reaction tank includes a stirrer for mixing the raw water introduced therein.

5. The water treatment apparatus of claim 1, wherein the ceramic filter is manufactured by mixing a ceramic powder, a binder, and sodium hexaphosphate.

6. The water treatment apparatus of claim 5, wherein the ceramic filter is manufactured by mixing 100 parts by weight of the ceramic powder, 10 to 50 parts by weight of the binder, and 20 to 40 parts by weight of the sodium hexaphosphate.

7. The water treatment apparatus of claim 5, wherein the binder is at least one selected from the group consisting of polypropylene, polyurethane, and ultrahigh-molecular-weight polyethylene.

8. The water treatment apparatus of claim 1, wherein the scale formation inhibitor is a ball formed of sodium polyphosphate (($NaPO3$)x, x being a positive number).

9. The water treatment apparatus of claim 1, further comprising a loss prevention plate provided at the flow channel filled with the scale formation inhibitor and configured to prevent loss of the scale formation inhibitor.

10. The water treatment apparatus of claim 1, further comprising: a filter module connected to the treatment water outlet of the anammox reaction tank and into which raw water discharged from the anammox reaction tank is fed; and the recovery unit for supplying backwash water to the filter module.

11. The water treatment apparatus of claim 10, wherein a disk filter included in the filter module has a pore size of 25 to 300 µm.

12. The water treatment apparatus of claim 10, wherein the anammox reaction tank includes a measurement part for measuring a sludge concentration of the anammox microorganism contained in the raw water.

13. The water treatment apparatus of claim 12, wherein the filter module includes a plurality of disk filters having different pore sizes, and a controller is provided to select the disk filter of the plurality of disk filters suitable for filtering raw water depending on the concentration measured using the measurement part of the anammox reaction tank.

* * * * *